Dec. 2, 1969  G. B. BARON  3,481,222
PLANETARY GEAR REDUCER
Filed June 7, 1968  4 Sheets-Sheet 1
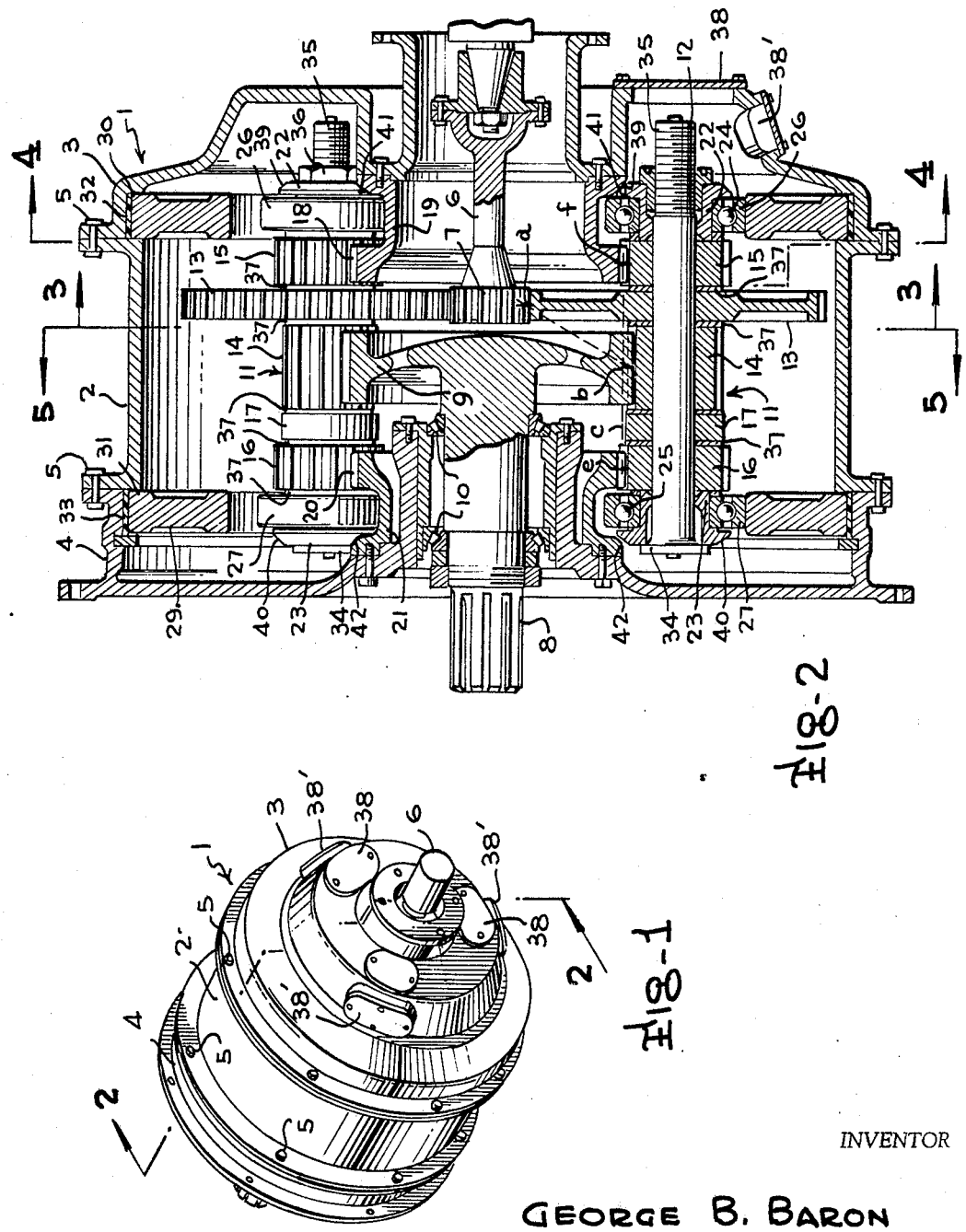
INVENTOR
GEORGE B. BARON
BY Mason, Fenwick & Lawrence
ATTORNEYS Dec. 2, 1969   G. B. BARON   3,481,222
PLANETARY GEAR REDUCER
Filed June 7, 1968   4 Sheets-Sheet 2

INVENTOR
GEORGE B. BARON
BY Mason, Fenwick & Lawrence
ATTORNEYS

Dec. 2, 1969   G. B. BARON   3,481,222
PLANETARY GEAR REDUCER
Filed June 7, 1968   4 Sheets-Sheet 3
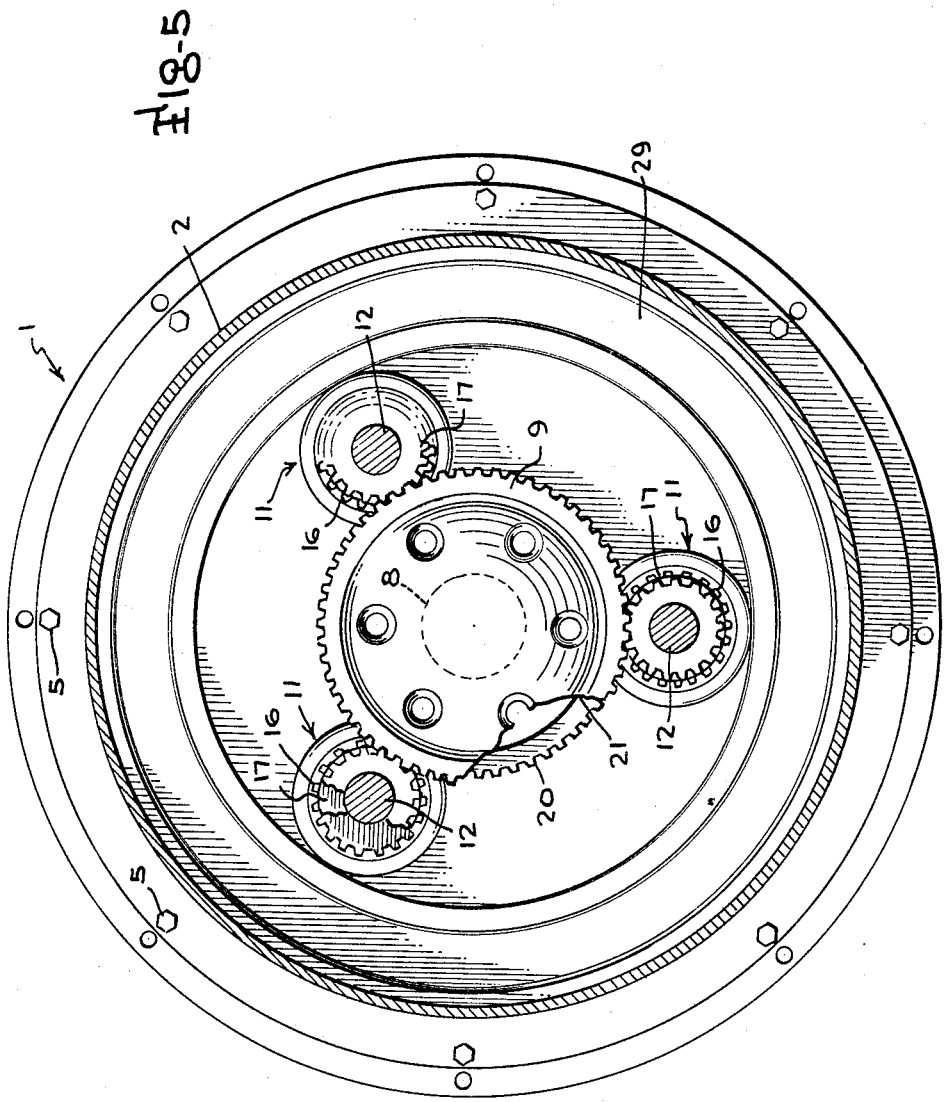
INVENTOR
GEORGE B. BARON
BY Mason, Fenwick & Lawrence
ATTORNEYS United States Patent Office 3,481,222
Patented Dec. 2, 1969

3,481,222
PLANETARY GEAR REDUCER
George B. Baron, Marion, Ohio, assignor to Marion
Power Shovel Company, Inc., Marion, Ohio, a corporation of Delaware
Filed June 7, 1968, Ser. No. 735,469
Int. Cl. F16h 1/28
U.S. Cl. 74—802                 20 Claims

ABSTRACT OF THE DISCLOSURE

A planetary gear system wherein the planets are gear clusters equally spaced about input and output shafts, with reaction pinions in the clusters in mesh with stationary reaction gears to maintain the cluster positions around the central axis and counteract tangential loads on the clusters. Elements in the clusters roll within floating rings to counteract radial loads and maintain the clusters in mesh with input, output and reaction gears. Rolling surfaces on the ends of clusters support cluster weight in vertical systems. Clusters are composed of separate elements held in compressive engagement and act as integral members.

Background of the invention

This invention relates to gear systems, and particularly to planetary gear reducers.

Prior planetary or epicyclic reducers have required some form of carrier for the planet gears. The carrier had to be made with a high degree of accuracy with regard to spacing and parallelism of the planet center lines. The bearings of the carrier had to withstand relatively large loads arising from the tangential, and sometimes the radial components of the gear tooth loads.

Most prior planetary reducers use internal gears, with the planet gears acting as idlers, thus doubling the effect of tangential gear tooth loads on the planet bearings. One known exception has no internal gears, but an accurately made carrier with relatively heavy bearings is required.

Use of carriers and internal positioning of the planets has been the custom to maintain the precise parallelism and accurate spacing of the planets to insure proper tracking of the planets about a sun gear.

Summary of the invention

The general object of the present invention is to provide a planetary gear system which is simplified from a manufacturing viewpoint over prior systems.

A more specific object is to provide a planetary system which requires no internal gears and no planet carrier.

Another object is the provision of such a system wherein the forces are balanced so that the planet bearings carry only radial components of the tooth loads, plus more or less centrifugal force.

A further object is to provide a planetary system wherein there are planet clusters spaced about the central gears and maintained in spaced relation by reaction gears which track about the system housing.

Yet another object is to provide such a system having rollers to resist radial thrust components, with the rollers riding in floating rings to prevent radial thrust components from being imposed on the casing.

A still further object is to provide a planetary system having planet clusters for movement about the central gears, with the planet clusters being composed of pluralities of separate gears and other elements to provide ease in assembly and alignment, and the separate elements of each cluster, after final assembly, acting as a single unit.

It is also an object of the invention to provide a planetary gear system of the above described type wherein the tangential loads taken by the reaction gears of a planet cluster are equal, and the radial loads taken by the rollers of a cluster are equal.

Other objects of the invention will become apparent from the following description of practical embodiments thereof, when taken in conjunction with the drawings which accompany, and form part of, this specification.

Brief description of the drawings

FIGURE 1 is a perspective view of a housed planetary gear reducer embodying the principles of the present invention;

FIGURE 2 is a greatly enlarged diametral section through the reducer, taken on the line 2—2 of FIGURE 1;

FIGURE 5 is a transverse section taken on the line 5—5 of FIGURE 2, illustrating the central output gear and its planetary driving pinions, the adjacent reaction pinions and their tracking gear on the housing, and the opposed rollers and annular ring.

Description of the preferred embodiments

Figure 4:
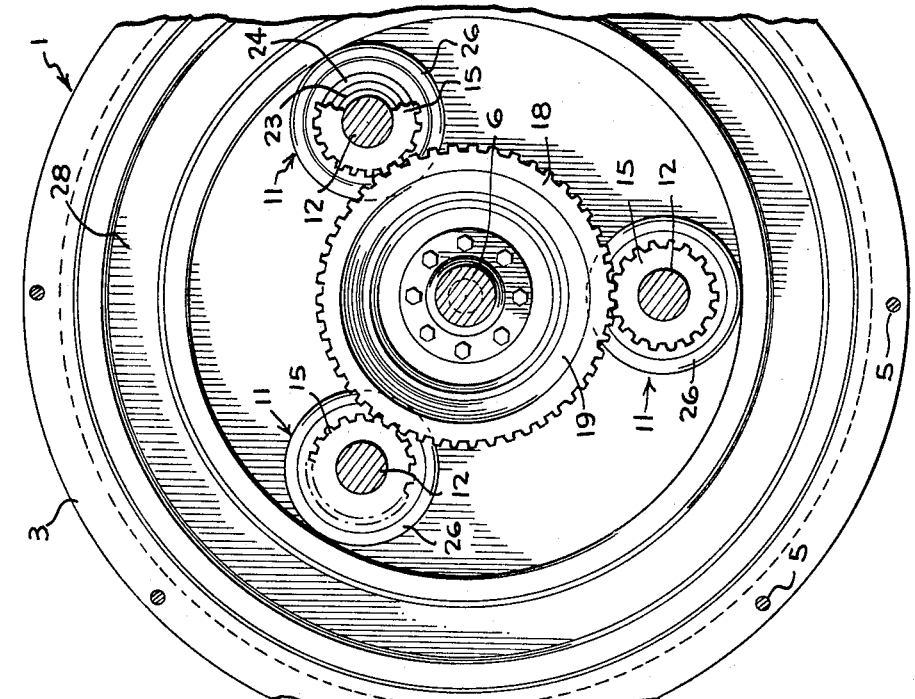
FIGURE 4 is a transverse section taken on the line 4—4, showing the reaction pinions and their tracking gear, and the radial thrust rollers and the floating ring with which they cooperate.
Figure 3:
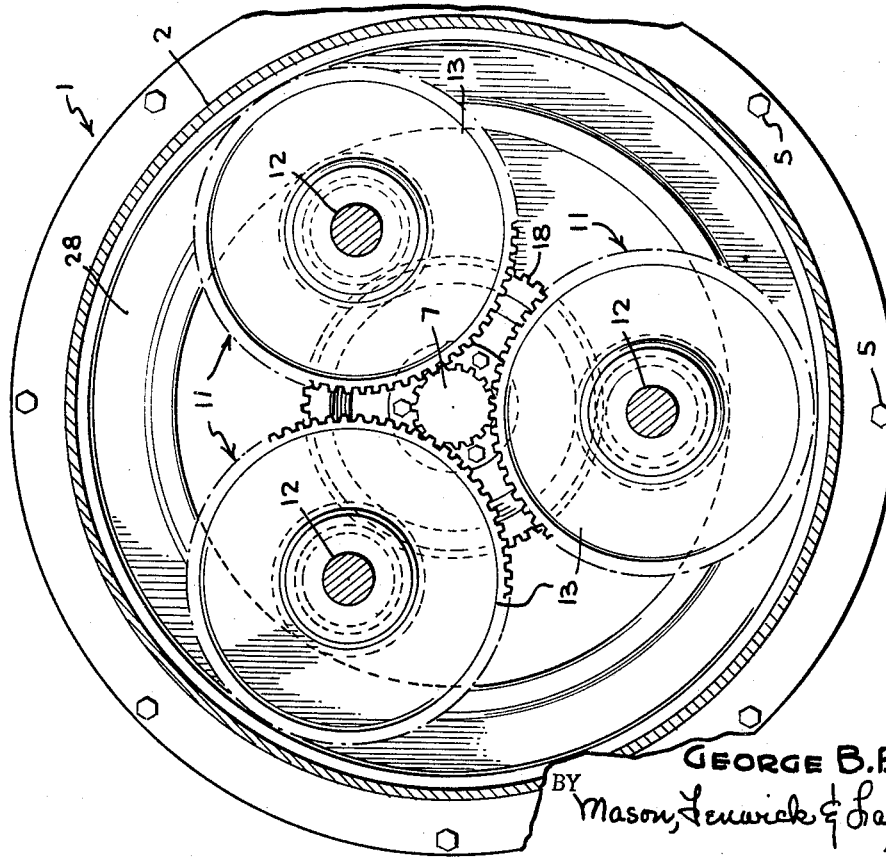
FIGURE 3 is a transverse section, taken on the line 3—3 of FIGURE 2, showing the central input pinion and its planetary meshing gears.

In general, the planetary gear reducer of the present invention includes more than one planet cluster, equally spaced, and movable about central gears, with the tangential thrust moment being taken by reaction pinions which track on a gear formed on the housing, and the radial component being taken by thrust rollers riding on the inside of a floating ring. The gears of the clusters are maintained in mesh with the central gears by the thrust rollers, and the spacing of the clusters and their parallel relation is maintained by the reaction gears.

A balance of loading on the respective rollers and the respective reaction gears is obtained by proper positioning of these elements relative to a selected plane parallel to the base of a cone-frustum generated by a line interconnecting the centers of mesh of the input and output gears with their respective planet gears.

Referring to the drawings in detail, and first to that form of the invention shown in FIGURES 1 to 5, the planetary gear reducer is shown as mounted within a housing 1. The housing, as illustrated, has a central, cylindrical section 2, an input end cap 3 and an output end cap 4. The three sections may be joined by bolts 5.

An input shaft 6 carries a drive pinion 7. It will be noted that shaft 6 is a relatively long, thin shaft and has no bearing mounting in the housing. This leaves the shaft free to float radially. An output shaft 8 carries an output gear 9, and is mounted in bearings 10 in the output end cap 4 of the housing. Thus, the output shaft and gear are not free floating.

The drive is transmitted from drive pinion 7 to the output gear 9 by means of a plurality of planet clusters 11. Three such clusters are shown, equally spaced around the common axis of the input and output shafts. Although each of the clusters is made up of a plurality of elements, each cluster, after assembly, acts as though it were an integral unit. As the several clusters are identical, only one will be described in detail.

The elements of each cluster are mounted upon a rod 12. Each rod carries an input gear 13, in mesh with drive pinion 7, and an output pinion 14 in mesh with output gear 9. Gear 13 and pinion 14 have adjacent positions on the rod. A pair of reaction pinions 15 and 16 are also carried by this rod, outboard of the gear 13 and pinion 14. If required to obtain proper spacing between the reaction pinions or equal tangential loading, as will be described, a spacer 17 may be placed between the pinion 14 and the reaction pinion 16. Reaction pinion 15 is in mesh with a stationary reaction gear 18 carried by a hub 19 bolted to the input end cap 3. Reaction pinion 16 is in mesh with a similar reaction gear 20 carried by a hub 21 on the output end cap 4. Near the outer ends of rod 12 are bearing supports 22 and 23, which carry bearings 24 and 25 upon which rollers 26 and 27 are mounted. The rollers are in bearing contact with the inner surfaces of floating rings 28 and 29. The outer peripheral edges of the floating rings are seated in annular channels 30 and 31 in the housing to hold them against movement in an axial direction. In some cases, rubber, or other suitable material, 32 and 33 may be placed around the floating rings to keep them from rattling or spinning in operation.

In order to hold the various elements in assembled relation on rod 12, the rod has a head 34 at one end for abutment with the bearing support 23. The opposite end of the rod is threaded, as at 35, and receives a nut 36. The nut seats against the outer face of bearing support 22 when tightened on the threaded end of the rod. Thus, the elements on the rod are held in tight frictional engagement when the nut is drawn up on the rod. In order to assure non-slipping of the several elements and transmittal of torque from one member to the next, washers 37 having a high coefficient of friction against the material of which the elements are formed are placed between the elements where torque is to be transmitted. In most instances, an adequate factor of safety against slipping can be obtained if the rod 12 is tightened to a static stress of the same order of magnitude as the nominal bending stress in the gear teeth. It will be noted that the threaded end of the rod is extended, and the input cap 3 is provided with removable cover plate 38 in line with the rods so that a tool, such as hydraulic puller, can engage the rod and bearing support 22 to compress the elements on the rod. Nut 36 can be turned up by hand by inserting a wrench through openings 38', and the assembly released to the compression of the nut without subjecting the assembly to any torque during tightening.

In assembling and locking the elements of the clusters in tight frictional engagement, it is not necessary that there be any precise indexing of one gear with respect to another, either in the cluster or in the housing, although the reaction gears 18 and 20 should have their teeth approximately in line. Exact timing and alignment are achieved by the method of assembly, since the clusters are first put together in the loose condition and then pushed radially into tight mesh with the central gears. Tightening of the shafts takes place while the clusters are so held. This construction also makes the clusters very rigid as compared to structures with gears placed on spline shafts. In order to achieve the proper alighment and timing of the gears, the elements are slipped loosely on the rods 12 and the clusters placed about the central gears. Pressure is then imposed radially of the unit at the centers of the output pinions 14, to obtain proper mesh with the output gear 9, and the output shaft is then locked. Manual oscillation of the input pinion 7 between progressively decreasing limits will cause some slight slipping of the elements on the rods to bring the meshing gears into proper position. The elements are then drawn up into tight relation on rods 12 and the nuts securely drawn up to hold the elements in frictional engagement. This will assure proper meshing of all of the gears.

The use of the reaction pinions 15 and 16 in mesh with the stationary reaction gears 18 and 20 accomplishes two purposes. The several clusters are held in proper spaced relation around the central axis of the unit, and the tangential loads on the clusters, which tend to tilt the clusters out of parallelism with the central axis of the unit, are counteracted. In other words, the tracking of the reaction pinions about their respective reaction gears maintain their spacing, and the tendency of the clusters to tilt, due to the force applied at the input mesh, is resisted by the meshing engagement of the reaction pinions with the stationary reaction gears on opposite sides of the input and output meshes. Equal tangential loads on the two reaction gears can be achieved by placing the center of each reaction mesh equidistant from the intersection of the reaction gear pitch cylinder and a line drawn between the centers of the input and output meshes. This is illustrated in FIGURE 2 of the drawings wherein $a$ represents the center of the input mesh, $b$ the center of the output mesh, $c$ the pitch cylinder of the reaction gears and $e$ and $f$ the respective centers of reaction mesh. If, for some reason, it is desired to make the tangential loads on the reaction gears unequal, this can be accomplished by a different spacing of the gears without affecting the principle of operation.

Radial components of tooth loads on the clusters are taken by the rollers 26 and 27 in bearing contact with the floating rings 28 and 29. The rollers simply roll along the inner surface of the floating rings, transmitting the radical thrust to the rings. As the rollers are equally spaced around the ring, the thrust is equally distributed and will not be transferred by the rings to the housing. Slight errors in tooth spacing, indexing, concentricity, etc. may cause gyration of the floating rings, but this is no problem in a relatively low speed system.

If all the teeth of the gears are made with the same presure angle, the radical loads imposed upon the rollers at opposite ends of the clusters will be equal, since these rollers are equidistant from the intersection of the line interconnecting the input and output mesh centers and the pitch cylinder of the reaction gears. If the unit is used in a position where the central axis is vertical, locational thrusts or thrusts due to cluster weight, is taken by a rolling action at the ends of the cluster. It will be noted that the bearing supports 22 and 23 are formed at their outer ends so as to provide spherical, or toroidal, rollers 39 and 40 respectively, to roll on stationary toroidal, or spherical, rings 41 and 42 formed on the hubs 19 and 21 of the housing. Contact between the roller members 39 and 40 and the rings 41 and 42 is localized to coincide with a projection of the reaction gear pitch cylinder, so that sliding of the rollers on the rings will be minimized.

The present planetary system has the advantage of having only one basic center line through the unit. Lack of precise parallelism between several shafts is not a problem, as it has been in conventional units, particularly the larger ones. The total load carried by the bearings is quite small thus reducing the total cost of bearings. The system has more parts than a conventional unit, but the parts are smaller and simpler, and some of them are duplicated a number of times so that more economical production is possible.

Figure 6:
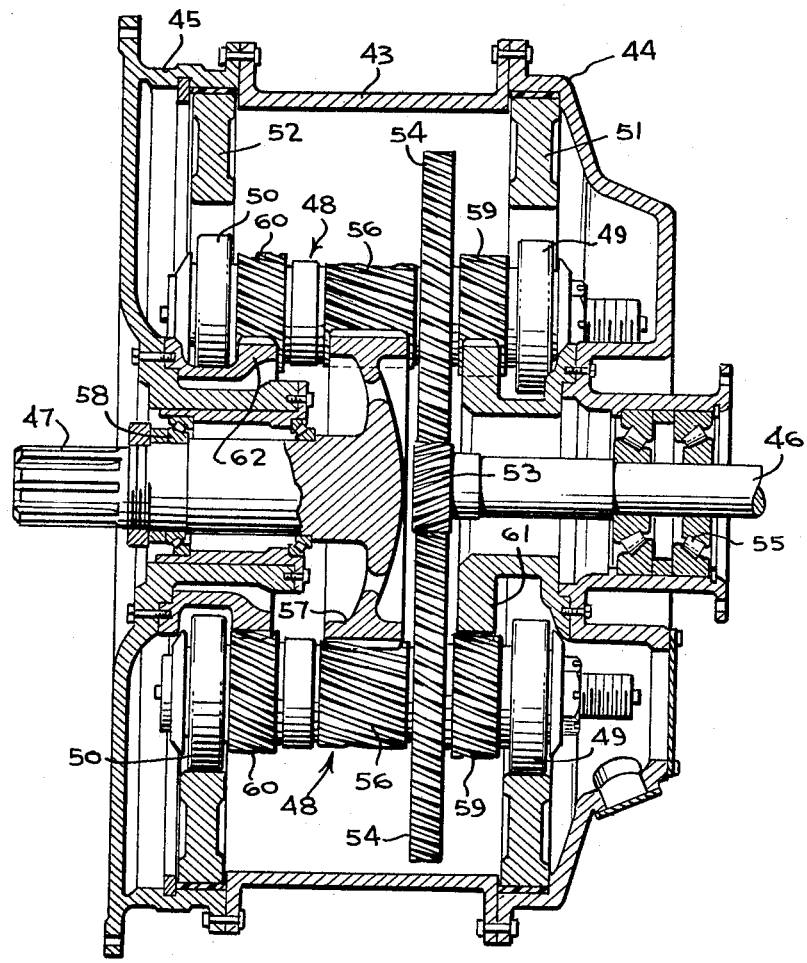
FIGURE 6 is a view similar to FIGURE 2, showing a reducer employing helical gears.

Referring now to FIGURE 6, it will be seen that a modified arrangement has been shown using helical gears. The housing, having central section 43, input end cap 44 and output end cap 45, is the same as in the previously-described form. This form also has an input shaft 46, an output shaft 47 and planet clusters 48 about the common axis of the input and output shafts. The clusters carry rollers 49 and 50 which bear against the interiors of rings 51 and 52.

Input shaft 46 carries a helical drive pinion 53, shown as being left-hand, which is in mesh with input gears 54 on the clusters, which gears are shown as being right-hand. Due to the component of thrust developed in an axial direction when helical gears are employed, it will be necessary to use thrust bearings 55 on the input shaft.

Each cluster carries an output pinion 56 in mesh with an output gear 57 on output shaft 47. Here, again, it is necessary to employ thrust bearings 58. Output pinions 56 are right-hand and have the same helix angle as input gears 54. Consequently, the drive pinion 53 and the output gear 57 will have the same helix angle and the same hand.

The clusters also carry helical reaction pinions 59 and 60 meshing with helical reaction gears 61 and 62 fixed to the end caps 44 and 45. The pinions will be the same angle and hand as the remaining cluster gears, and the reaction gears will be the same angle and hand as the drive pinion and output gear.

It will be seen from the above, that all of the gears on the clusters will have the same angle and hand, and all of the gears coaxial with input and output shafts will be of the same angle and hand. This is necessary to the proper functioning of the reducer, and will result in all thrust loads on each balancing out completely.

In all respects other than those specified above, the helical gear arrangement will be the same, and function the same, as the first-described form.

While in the above one practical embodiment of the invention has been disclosed, it will be understood that the particular details of construction shown and described are merely by way of illustration, and the invention may take other forms within the scope of the appended claims.

What is claimed is:

1. A planetary gear system comprising, a housing, an input shaft and drive gear, an output shaft and driven gear in axial alignment with the input shaft and drive gear, a bearing in the housing mounting the output shaft, a reaction gear carried by the housing coaxial with the input and output shafts, planet clusters equally spaced apart about the reaction gear, a reaction pinion on each cluster in mesh with the reaction gear, input and output gears on the cluster in mesh respectively with the drive gear and driven gear, a floating ring surrounding the clusters, and a rolling surface on each cluster in contact with the interior surface of the floating ring to hold the clusters against radially outward movement.

2. A planetary gear system as claimed in claim 1 wherein, the input shaft and drive gear is free to float radially to the input shaft and drive gear axis.

3. A planetary gear system as claimed in claim 1 wherein, the reaction pinion and input and output gears of each planet system are separate elements held in compressive contact to operate as a unitary member.

4. A planetary gear system as claimed in claim 3 wherein, the rolling surface of each planet cluster is a roller mounted in the cluster for free rotation relative thereto.

5. A planetary gear system as claimed in claim 1 wherein, the drive gear, driven gear, reaction gear, reaction pinion and input and output gears on the clusters are helical gears.

6. A planetary gear system as claimed in claim 1 wherein, the drive gear, driven gear and reaction gear are helical gears having the same helix angle and the same hand, and the input and output gears on the clusters and the reaction pinion are helical gears having the same helix angle and opposite had to the drive gear, driven gear and reaction gear.

7. A planetary gear system as claimed in claim 1 wherein, the reaction gear is in two parts, with the parts spaced and each located outboard of the input drive gear and output driven gear, and there are two reaction pinions on each cluster in mesh with the reaction gear parts.

8. A planetary gear system as claimed in claim 7 wherein, there are two floating rings spaced apart axially of the input and output shafts, and the rolling surface of each cluster is divided into two parts one in contact with each floating ring.

9. A planetary gear system as claimed in claim 8 wherein, the rolling surfaces are rollers mounted for free rotation relative to the clusters.

10. A planetary gear system as claimed in claim 8 wherein, the rollers are located outboard of the reaction pinions.

11. A planetary gear system as claimed in claim 9 wherein, the rollers are on bearings, the roller bearings, reaction pinions and cluster input and output gears are separate cluster elements and there are means to hold the separate cluster elements in compressive contact to rotate as a unit.

12. A planetary gear system as claimed in claim 10 wherein, the input shaft and drive gear is free to float radially to the input shaft and drive gear axis.

13. A planetary gear system comprising, a housing, bearings in the housing, an output shaft and driven gear mounted in the bearings, an input shaft and drive gear in axial alignment with the output shaft, reaction gears carried by the housing coaxial with the output shaft and located outboard of the drive gear and driven gear, planet clusters equally spaced apart around the reaction gears, each cluster having reaction pinions in mesh with the reaction gears, an input gear on each cluster in mesh with the input drive gear, an output gear on each cluster in mesh with the output driven gear, floating rings encircling the assembled reaction gears and planet clusters, and rollers carried by the planet clusters in rolling contact with the inner surfaces of the rings.

14. A planetary gear system as claimed in claim 13 wherein, the rollers are outboard of the reaction pinions on the planet clusters.

15. A planetary gear system as claimed in claim 13 wherein, the input shaft and drive gear are free to float radially to the input shaft axis.

16. A planetary gear system as claimed in claim 13 wherein, the rollers are mounted on bearings, the roller bearings, reaction pinions and input and output cluster gears are separate cluster elements, and means to hold the cluster elements in compressive contact to rotate as a unit.

17. A planetary gear system as claimed in claim 13 wherein, each planet cluster includes a rod with the cluster input and output gears and the reaction pinions freely mounted thereon, bearings for the rollers freely mounted on the rods, and means on the rod to compress and hold in compressive contact the roller bearings, cluster input and output gears and the reaction pinions so as to rotate as a unit.

18. A planetary gear system as claimed in claim 13 wherein, the drive gear, driven gear, reaction gears, reaction pinions, and input and output gears on the clusters are helical gears.

19. A planetary gear system as claimed in claim 13 wherein, the drive gear, driven gear and reaction gears are helical gears having the same helix angle and the same hand, and the input and output gears on the clusters and the reaction pinions are helical gears having the same helix angle and opposite hand to the drive gear, driven gear and reaction gears.

20. A planetary gear system as claimed in claim 19 wherein, there are bearings in the housing to carry the axial thrust of the drive gear and driven gear.

References Cited

UNITED STATES PATENTS

| | | | |
|---|---|---|---|
| 1,223,259 | 4/1917 | Cottam | 74—802 |
| 2,091,637 | 8/1937 | Hoffman et al. | 74—410 |
| 2,759,374 | 8/1956 | Bowman et al. | 74—750 |
| 2,944,444 | 7/1960 | Burns | 74—801 |
| 3,258,995 | 7/1966 | Bennett et al. | 74—801 |
| 3,279,280 | 10/1966 | Braden et al. | 74—750 X |
| 3,307,433 | 3/1967 | Bennett et al. | 74—801 |
| 3,401,580 | 9/1968 | Sigg | 74—801 |

ARTHUR T. McKEON, Primary Examiner

U.S. Cl. X.R.

74—410, 750